(12) United States Patent
Lin

(10) Patent No.: US 10,807,427 B2
(45) Date of Patent: Oct. 20, 2020

(54) SLIDER-SUSPENSION UNIT

(71) Applicant: FUWA K Hitch (Australia) Pty Ltd, Derrimut, VIC (AU)

(72) Inventor: Zecan Lin, Derrimut (AU)

(73) Assignee: FUWA K Hitch Australia Pty Ltd, Derrimut, VIC (AU)

( * ) Notice: Subject to any disclaimer, the term of this patent is extended or adjusted under 35 U.S.C. 154(b) by 234 days.

(21) Appl. No.: 16/011,699

(22) Filed: Jun. 19, 2018

(65) Prior Publication Data

US 2018/0370311 A1    Dec. 27, 2018

Related U.S. Application Data

(60) Provisional application No. 62/524,890, filed on Jun. 26, 2017.

(51) Int. Cl.
| | | |
|---|---|---|
| *B60G 5/00* | (2006.01) | |
| *B62D 21/02* | (2006.01) | |
| *B62D 53/06* | (2006.01) | |
| *B62D 21/11* | (2006.01) | |
| *B62D 21/20* | (2006.01) | |

(52) U.S. Cl.
CPC ............ *B60G 5/005* (2013.01); *B62D 21/02* (2013.01); *B62D 21/11* (2013.01); *B62D 21/20* (2013.01); *B62D 53/068* (2013.01); *B60G 2204/4232* (2013.01); *B60G 2206/011* (2013.01); *B60G 2206/601* (2013.01); *B60G 2206/82* (2013.01); *B60G 2300/042* (2013.01)

(58) Field of Classification Search
CPC ............ B60G 5/005; B60G 2206/601; B60G 2206/011; B60G 2206/82; B60G 2300/042; B60G 2204/4232; B62D 21/20; B62D 21/02; B62D 21/11; B62D 53/068
See application file for complete search history.

(56) References Cited

U.S. PATENT DOCUMENTS

| | | | | |
|---|---|---|---|---|
| 2,621,059 | A * | 12/1952 | Ridgway | B62D 53/06 280/795 |
| 3,087,741 | A * | 4/1963 | De Lay | B62D 53/068 280/81.1 |
| 3,406,439 | A * | 10/1968 | Hutchens | B61F 5/52 29/897.2 |
| 4,726,166 | A * | 2/1988 | DeRees | B62D 21/02 52/694 |
| 4,889,361 | A * | 12/1989 | Booher | B60G 5/053 280/124.175 |
| 5,118,131 | A * | 6/1992 | Manning | B60G 7/02 280/124.109 |
| 8,801,013 | B2 * | 8/2014 | Ramsey | B60G 99/00 280/124.11 |
| 9,827,820 | B2 * | 11/2017 | McComsey | B62D 21/11 |
| 10,370,033 | B1 * | 8/2019 | Klein | B62D 53/068 |

(Continued)

FOREIGN PATENT DOCUMENTS

CA    3007871 A1 * 12/2018 ............ B62D 21/11

*Primary Examiner* — Karen Beck
(74) *Attorney, Agent, or Firm* — Potomac Law Group, PLLC; Kenneth Fagin

(57) ABSTRACT

A chassis portion, for a vehicle chassis, including a chassis rail 33*b*, a cross member 35*a*, a suspension hanger 51 integral, fastened or fastenable to the cross member, and an arrangement for clamping, a portion of the chassis rail, between a portion of the hanger and a portion of the cross member.

23 Claims, 3 Drawing Sheets

(56) References Cited

U.S. PATENT DOCUMENTS

| | | | | |
|---|---|---|---|---|
| 2009/0243247 | A1* | 10/2009 | Richardson | B60G 11/46 280/124.109 |
| 2016/0121929 | A1* | 5/2016 | Levin | B60G 7/02 296/193.02 |
| 2017/0274945 | A1* | 9/2017 | Tran | B62D 63/061 |
| 2018/0264903 | A1* | 9/2018 | Stuart | B60G 5/065 |
| 2018/0363096 | A1* | 12/2018 | Sohmshetty | C21D 1/673 |
| 2019/0152546 | A1* | 5/2019 | Jones | B62D 21/20 |

* cited by examiner

SLIDER-SUSPENSION UNIT

FIELD

The invention relates to chassis and slider-suspension units, and to components and methods therefor.

BACKGROUND

Semi-trailers are often used for transporting goods. A semi-trailer is a vehicle including a prime mover and a trailer. The trailer has an arrangement of wheels at its rear and at its front a kingpin which mates with the fifth wheel of the prime mover.

Some jurisdictions regulate the location of the arrangement of wheels along the trailer. These regulations can vary from jurisdiction to jurisdiction. This can present a problem in that a trailer having a fixed arrangement of wheels cannot be used to legally transport goods from one jurisdiction to another.

To address this problem, slider-suspension units have been developed. Slider-suspension units are sometimes known as "van sliders".

FIG. 1 illustrates a typical slider-suspension unit. It includes a ladder-frame chassis 1 including a pair of chassis rails 3a, 3b connected to each other by a trio of cross members 5a, 5b, 5c. The chassis 1 is a weldment and provides a solid "base" from which the suspension hangers 7 are hung.

A suspension hanger is a member including arm portions 7a, 7b which are spaced from each other and define suitable mounting holes to receive and pivotally mount a suspension component such as the trailing arm 9.

As one of ordinary skill in the art would appreciate, suspension components by which wheels are suspended are mounted to the suspension hangers 7.

The slider unit 1 includes four locking pins 11 which in use project laterally beyond the outer side walls of the chassis rails 3a, 3b. A transmission 13 connects the locking pins to a handle 15 so that the handle can be pulled upon to withdraw the locking pins.

The transmission 13 includes a crank shaft 13a, an input crank 13b and output cranks 13c. The handle 15 is one end of a member, the other end of which is pivotally connected to the outer end of the input crank 13b. The shaft 13a and cranks 13b, 13c are a single member (i.e. are rigidly connected to move as a unitary body) so that pulling upon the handle 15 causes the output cranks 13c to rotate. Con rods 13d connect the cranks 13c to the pins 11. A tension spring 13e acts between chassis rail 3a and the input crank 13b to bias the locking pins towards their extended, locking, positions.

In use, the suspension unit 1 sits beneath a trailer body including a pair of longitudinal mounting flanges (not shown). Each of the mounting flanges sits laterally outwards of a respective one of the chassis rails 3a, 3b. The mounting flanges are penetrated by a suitable series of holes for receiving the locking pins 11 when the unit 1 is at a selected position along the trailer. The locking pins engage the holes of the mounting flanges to lock the slider-suspension unit in position.

When a trailer is to be moved from one jurisdiction to another having different regulations, the handle 15 can be pulled to withdraw the locking pins to enable the slider unit 1 to be slid along the trailer body to a selected location compliant with the different regulations. When the handle is released, under the influence of spring 13a, the pins 11 extend to engage the trailer body's mounting flanges to again lock the suspension in place.

FIGS. 2 and 3 illustrate a slider suspension unit 17 exhibited by Cush Corp at the Mid-American Trucking Show (MATS) 2016. This unit incorporates hangers 19 and side rails 21.

The unit 17 incorporates a respective pneumatic actuator 29 for each of its locking pins. Other prior art units incorporate transmissions akin to the transmission 13 which have a suitable actuator in place of the handle 15.

The rails 21 include inwardly directed top and bottom flange portions 23, 25 to receive cross members 27. The top flange 23 is riveted to the cross member 27. The hanger 19 further includes an inwardly directed wing 19a by which the hanger 19 is riveted to an upright wall of cross member 27.

The slider-suspension unit 17 carries pneumatic suspension in contrast to the mechanical suspension of the slider unit 1.

Slider-suspension units should be as light as possible. Typically a total vehicle mass, including the mass of its cargo, is limited by regulation. As such, every kilogram that can be saved from the slider-suspension unit is an additional kilogram that the trailer can carry each and every time it is used. It is also desirable to impede corrosion and provide the suspension unit to an end user at the minimum possible cost.

With the foregoing in mind, preferred forms of the invention aim to provide improvements in and for slider-suspension units, or at least to provide alternatives for those concerned with slider-suspension units. Some aspects of the invention may be applied in contexts other than slider-suspension units.

For the avoidance of doubt, "integrally formed" and variants of this terminology are used in their ordinary sense in this context to refer to a component that is formed of a single continuous phase of material. Components may be integrated through processes such as welding, but not by conventional mechanical fastening which results in two distinct bodies albeit that those distinct bodies are mutually fastened to form a unitary member.

Also for the avoidance of doubt, "fastening" is used herein in a broad sense to take in both mechanical fastenings (nuts, bolts, rivets, etc) and other techniques for mutually fastening components, such as welding.

It is not admitted that any of the information in this patent specification is common general knowledge, or that the person skilled in the art could be reasonably expected to ascertain or understand it, regard it as relevant or combine it in any way before the priority date.

SUMMARY

One aspect of the invention provides a chassis portion, for a vehicle chassis, including a chassis rail;

a cross member;

a suspension hanger integral, fastened or fastenable to the cross member; and an arrangement for clamping, a portion of the chassis rail, between a portion of the hanger and a portion of the cross member.

The chassis rail may be penetrated by at least one fastener-receiving opening, in which case the arrangement for clamping preferably includes at least one fastener portion for passing through the fastener-receiving opening.

Preferably the cross member is distinct from the hanger and has a feature by which the cross member is fastened or fastenable to the hanger. The feature may be at least one of a fastener portion and a hole for a fastener portion. Preferably an underside of the cross member has the feature.

Another aspect of the invention provides a chassis portion, for a vehicle chassis, including a chassis rail;

a cross member; and a suspension hanger;

an underside of the cross member having a feature by which the cross member is fastened or fastenable to the hanger;

the feature being at least one of a fastener portion and a hole for a fastener portion.

Preferably the feature is a hole for a fastener portion.

The chassis rail may define a rail-receiving opening into which an end of the cross member is receivable. Preferably the chassis rail has a top flange, running along a top of the rail-receiving opening, and a top flange feature by which the top flange is fastened or fastenable to the cross member.

Another aspect of the invention provides a chassis portion, for a vehicle chassis, including a chassis rail;

a cross member;

a bracket; and an arrangement for clamping, a portion of the chassis rail, between a portion of the bracket and a portion of the cross member;

an underside of the cross member having a feature by which the cross member is fastened or fastenable to the bracket;

the feature being at least one of a fastener portion and a hole for a fastener portion;

the chassis rail defining a rail-receiving opening into which an end of the cross member is receivable;

the chassis rail having a top flange running along a top of the rail-receiving opening and having a top flange feature by which the top flange is fastened or fastenable to the cross member.

The top flange feature may be one of a fastener and a fastener hole. Preferably it is a fastener hole.

The chassis rail may have a substantially uniform profile along at least most of its length. The chassis rail may have an inverted G-profile. The cross member may have two channels sections running parallel to, and opening towards, each other.

Preferably the chassis rail is individually coated with a corrosion impeding coating. Preferably the cross member is individually coated with a corrosion impeding coating.

The chassis portion may be a portion of a chassis for a slider-suspension unit for a trailer.

The slider-suspension unit may include locking pins for locking the unit at a selected position along the trailer, in which case the chassis portion preferably includes a shaft for rotating to withdraw the locking pins;

an actuator carried by one of the cross members and including a rotatable output portion; and a coupling by which an end of the shaft is coupled or couplable to, to be driven by, the output portion.

Another aspect of the invention provides a chassis, for a vehicle, including a chassis portion.

Another aspect of the invention provides a flat-pack kit including a chassis portion.

Another aspect of the invention provides a slider-suspension unit, for a trailer, including a chassis portion.

Another aspect of the invention provides a unit portion for a slider-suspension unit;

the slider-suspension unit including locking pins for locking the unit at a selected position along the trailer;

the unit portion including at least two cross members;

two chassis rails connected or connectable to each other by the at least two cross members;

a shaft for rotating to withdraw the locking pins;

an actuator carried by one of the cross members and including a rotatable output portion; and a coupling by which an end of the shaft is coupled or couplable to, to be driven by, the output portion.

Preferably one of the cross members, other than the one of the cross members carrying the actuator, has a feature for supporting the shaft. The shaft may be a crankshaft. The actuator may be a pneumatic actuator.

Another aspect of the invention provides a slider-suspension unit, for a trailer, including a unit portion.

Another aspect of the invention provides a method of installing a shaft of a slider-suspension unit;

the unit being for a trailer and including a first cross member;

a second cross member; and locking pins for locking the unit at a selected location along the trailer;

the second cross member carrying an actuator;

the actuator including a rotatable output portion;

the shaft being for rotating to withdraw the locking pins;

the method including whilst the first cross member is fixed relative to the second cross member coupling an end of the shaft to, to be driven by, the output portion; and arranging for a portion of the shaft, spaced from the end, to be supported by the first cross member.

The arranging is preferably sliding the other end of the shaft into or onto a feature of the second cross member. The coupling is preferably subsequent to the arranging.

DESCRIPTION OF EMBODIMENTS

The present inventors have recognised that the physical bulk of a slider-suspension unit contributes significantly to its cost. Within the factory, the ladder-frame weldment 3a, 3b, 5a, 5b is bulky and difficult to handle. Large scale equipment is required to maneouvre and apply coatings to this part. Moreover, the cost of transporting the unit 1 to the trailer manufacturer is a significant proportion of the cost faced by the trailer manufacturer. Welding can adversely affect material properties and properly coating a large, complex part such as the ladder-frame weldment can be problematic.

The present inventors have recognised that these and other problems can be addressed by providing a slider-suspension unit in the form of a kit made up of separate components that can be connected by mechanical fasteners. Blind fasteners, such as Huck fasteners, are preferred. By providing the slider suspension unit in kit form, the major components can be individually coated with a suitable corrosion-impeding coating more easily than coating a single large weldment. This improves the prospects of the components being properly covered. It also ensures that the interfaces between the major components are between coated portions of the components. This gives designers the option of utilising different metals for the different components without fear of excessive corrosion at the interfaces. The coating could be, by way of example, painting, powder coating or galvanisation.

Figure 1:
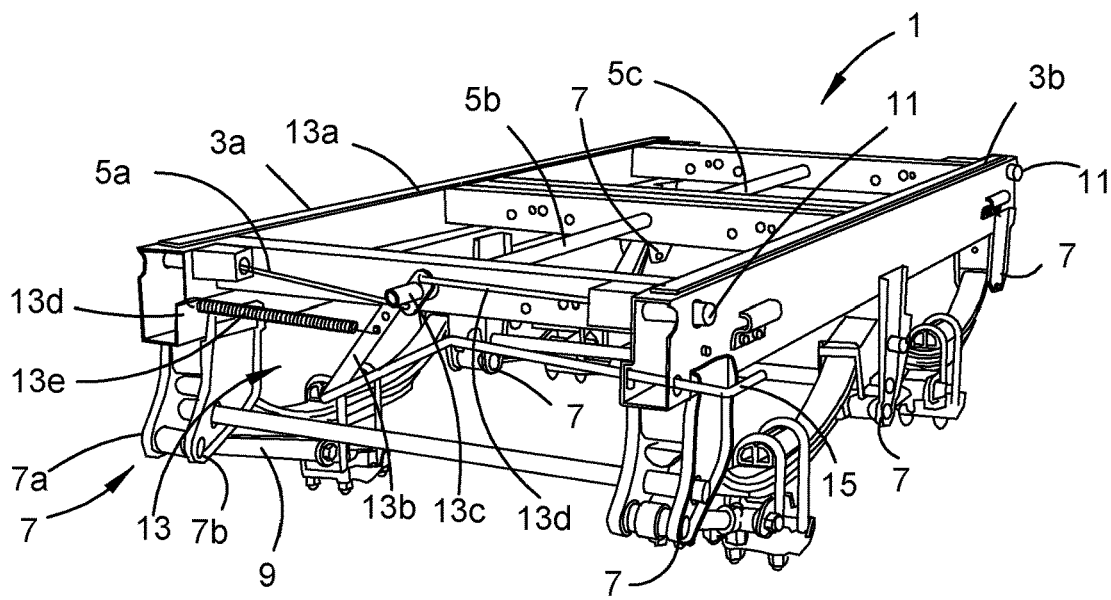
FIG. 1 is a perspective view of a prior art slider-suspension unit.
Figure 2:
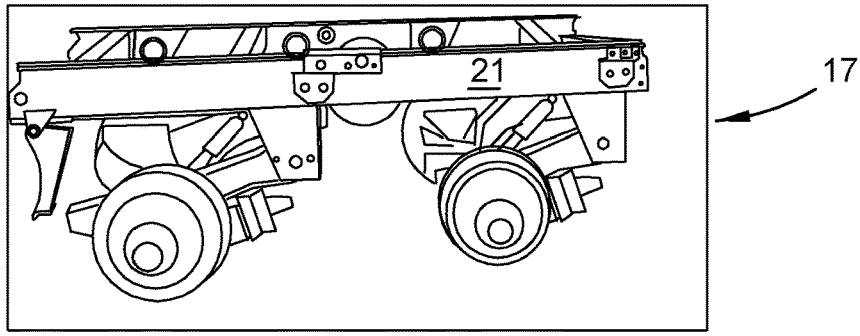
FIG. 2 is a perspective view of another prior art slider-suspension unit.
Figure 3:
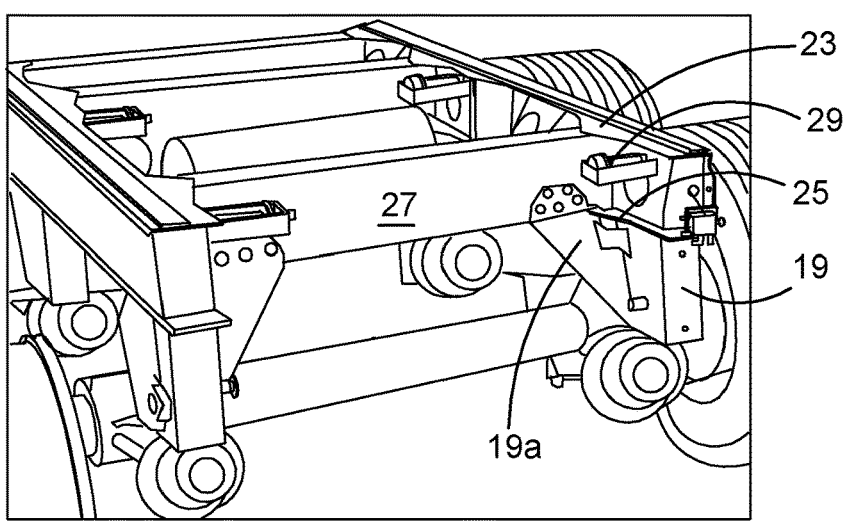
FIG. 3 is another perspective view of the slider-suspension unit of FIG. 2.
Figure 4:
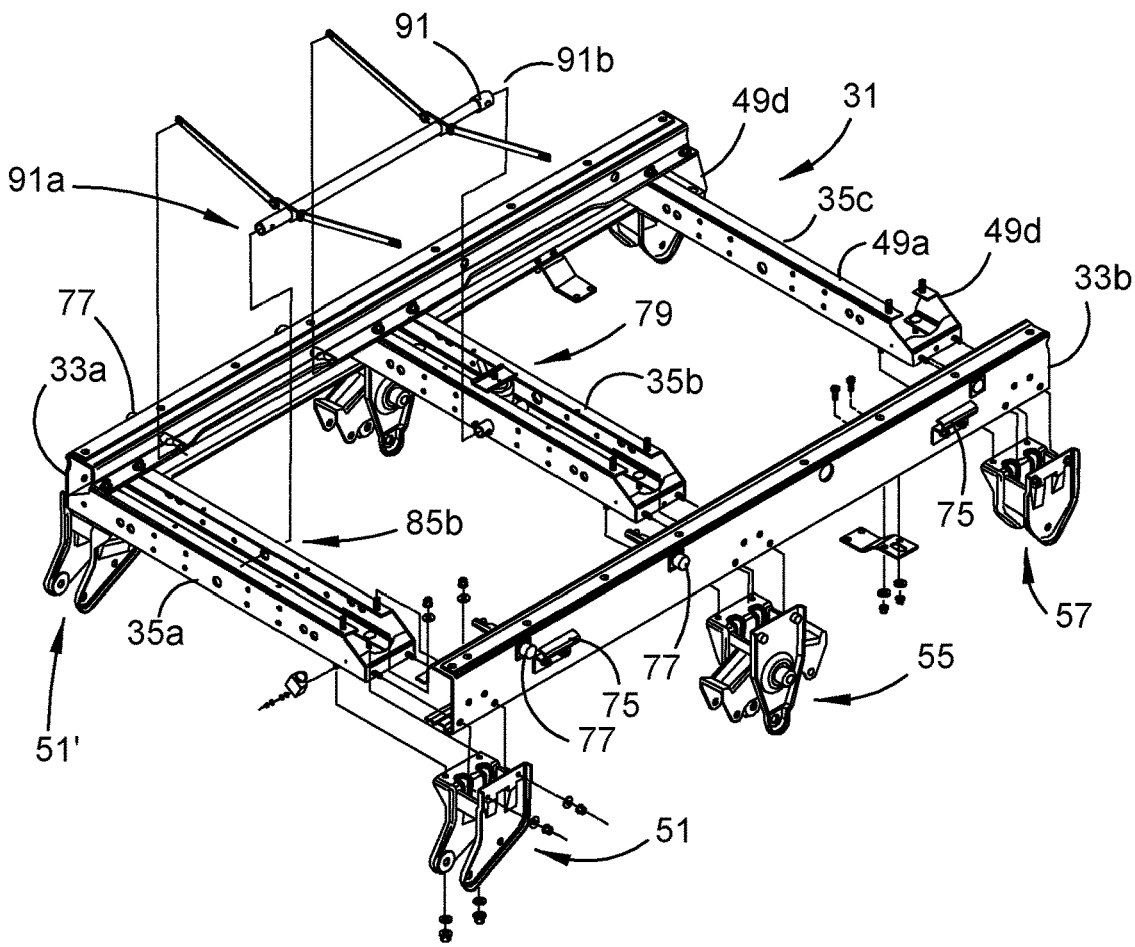
FIG. 4 is a perspective, partially exploded, view of a chassis.

FIG. 4 illustrates a chassis 31 including chassis rails 33a, 33b and cross members 35a, 35b, 35c. The rails 33a, 33b run in a longitudinal direction and are connected to each other by cross members 35a, 35b, 35c to form a ladder-frame. The rails 33a, 33b are identical to each other. This reduces inventory and manufacturing costs.

Figure 6:
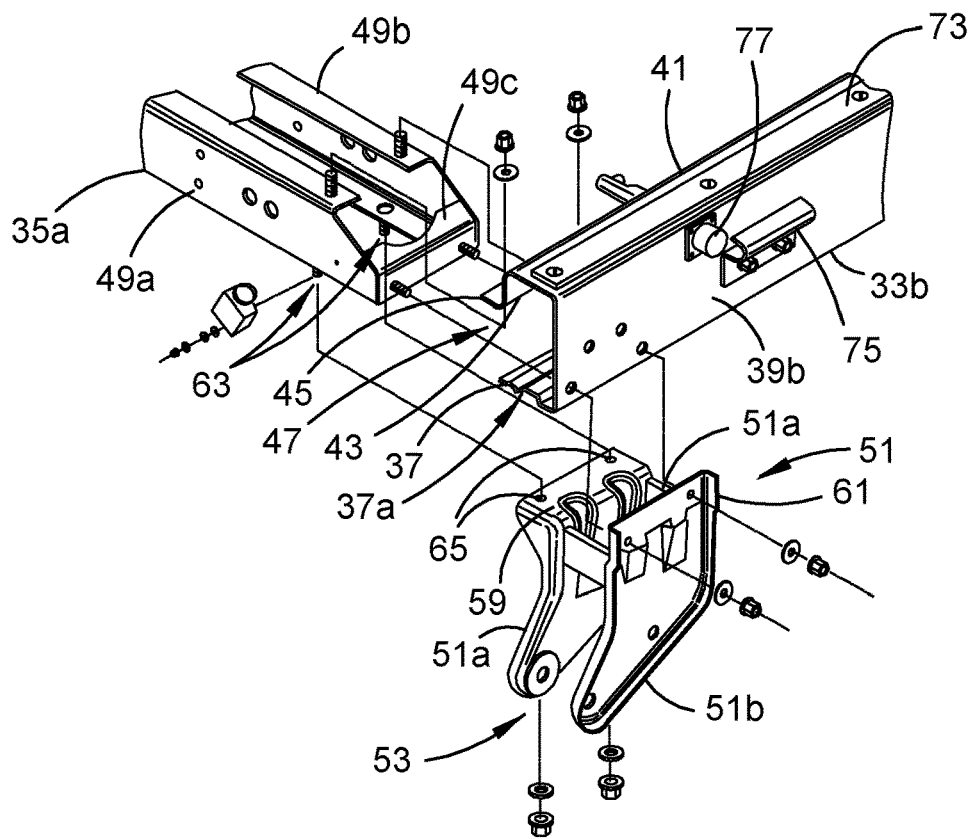
FIG. 6 is an exploded view of a chassis portion.

FIG. 6 is a close-up view of the junction between the chassis rail 33b and the cross member 35a. Both of these components are formed from sheet material. In this example, the sheet material is high grade steel and is about 4 mm thick.

The rail 33b has a substantially uniform "inverted G" profile along its length, including a bottom flange 37, a vertical side wall 39, a horizontal top wall 41, a short side wall 43, and, projecting horizontally towards the interior of the unit 31, a top flange 45. The flanges 37, 45 bracket a horizontally directed opening 47 into which the end of the cross member 35a is receivable. The bottom flange 37 has a central portion 37a, raised by 4 mm, running along its length. This raised portion serves to strengthen the bottom flange 37 to better resist braking forces when the unit 31 is in use. Other reinforcing formations are possible.

The cross member 35a includes a pair of mutually identical C-section members 49a, 49b. The members 49a, 49b run parallel to, and open towards, each other and are mutually connected by a respective capping piece 49c at each end of the member 35a. Preferred forms of the member 35a have at each end an upright end face. In this example, the member 49c defines an upright end face of the member 35a.

The members 49a, 49b, 49c of the cross member 35a are preferably a weldment, although other forms are possible.

The hanger 51 is a weldment of pressed metal components 51a, 51b, 51c. The components 51a, 51b are arms spaced and mutually connected by short channel section 51c. These arms define a pivotal mounting point 53 for pivotally mounting a suspension component. The hangers 55, 57 (FIG. 4) are of similar construction to the hanger 51. The hanger 51 defines a horizontal mounting flange 59 and a vertical mounting flange 61.

An underside of the member 35a includes a pair of fastener holes 63 penetrating the bottom flanges of the members 49a, 49b. The hanger's horizontal mounting flange 59 is penetrated by a pair of fastener holes 65 complementary to the holes 63 such that, when the components 33b, 35a, 51 are assembled, the holes 63 are in registration with the holes 65 to receive a fastener.

Figure 7:
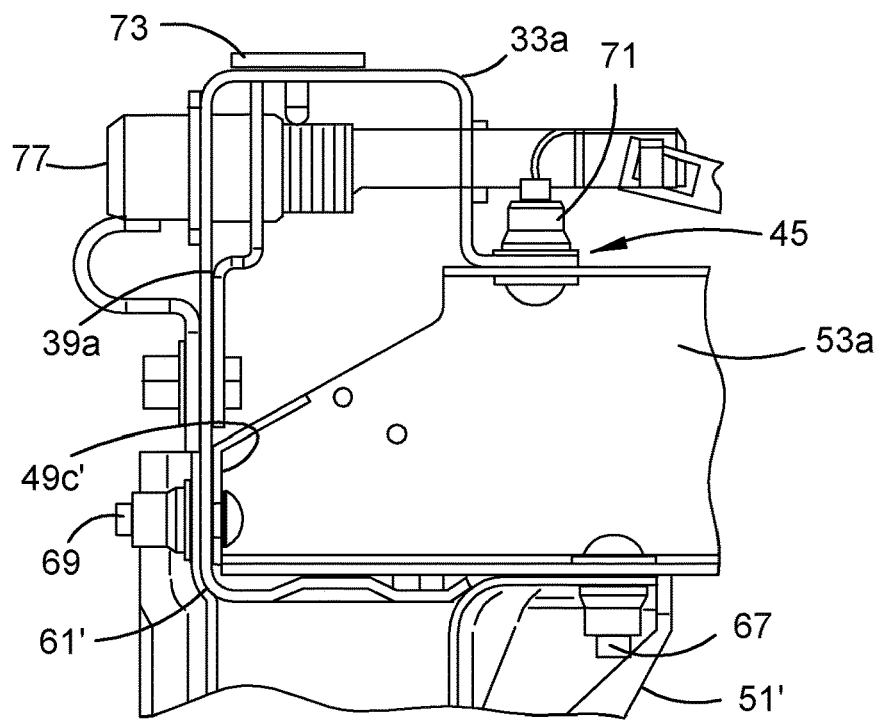
FIG. 7 is a cross-section view of a chassis portion.

FIG. 7 is a cross-section view through the juncture of cross member 35a and the chassis rail 33a. Hanger 51' is essentially a mirror image of the hanger 51. This figure shows a mechanical fastener 67 by which the hanger 51' is fastened to an underside of the cross member 35a.

The chassis rail 33a includes an outer side wall 39a penetrated by a pair of fastener holes horizontally spaced from each other and complementary to a pair of fastener holes formed through the end face of cross member 35a and to another pair of fastener holes through the flange 61. Through each of the two triple-layer holes a respective mechanical fastener 69 is passed through three layers of material to clamp the wall 39a between the flange 61' and the end wall 49c'. As such, all three components 33a, 35a, 51' are fastened to each other at a single, convenient, mechanical joint. Another variant of the juncture may incorporate a third triple-layer hole, e.g. sitting above the hole of the pair closest the end of the chassis rail. The end face of the cross member 35a may be extended to accommodate the third-triple layer hole. The centre hanger 55 is mounted via a pair of triple-layer holes. In another variant the hanger 55 may be mounted via a rectangular array of four triple-layer holes.

The top flange 45' sits atop the member 35a. The flange 45 has a pair of fastener holes complementary to a pair of fastener holes of the member 35a whereby the rail 33a is fastenable to the top of the cross member 35a with the aid of mechanical fastener 71.

As will be apparent from FIG. 7, the three mounting points corresponding to the fasteners 67, 69, 71 are mutually spaced for the efficient transfer of load between the components 33a, 35a, 51'. Thus a semi-skilled labourer can be employed to perform simple mechanical fastening operations to form a strong yet lightweight chassis portion. This is very cost-effective.

The corner portion of the chassis illustrated in FIG. 6 is brought together with only six fasteners corresponding to two fasteners at each of the top, bottom and side mounting points. The fasteners resist both tensile and shear loads. This relatively low fastener count reduces the material and installation costs of the fasteners. The described layout of components is surprisingly efficient in that it enables a relatively low fastener count and relatively thin sheet material to be used. Typically thin sheet material requires more fasteners.

Of course, variants of the disclosed arrangement are possible. By way of example, the fastener holes 65 could be replaced by threaded studs to pass through the holes 63. It is also possible that the hanger could be integral to one of the members 35a, 33b, e.g. the hanger 51 might be pre-welded to the chassis rail 33b.

The chassis rails 33a, 33b are topped by noise-suppressing strips 73 which are formed of a suitable plastic and presented to bear against an underside of the trailer body.

Each chassis rail 33a, 33b includes embracing features 75 for embracing an outwardly directed fold of the trailer body's mounting flange. The chassis rails also carry locking pins 77.

Figure 5:
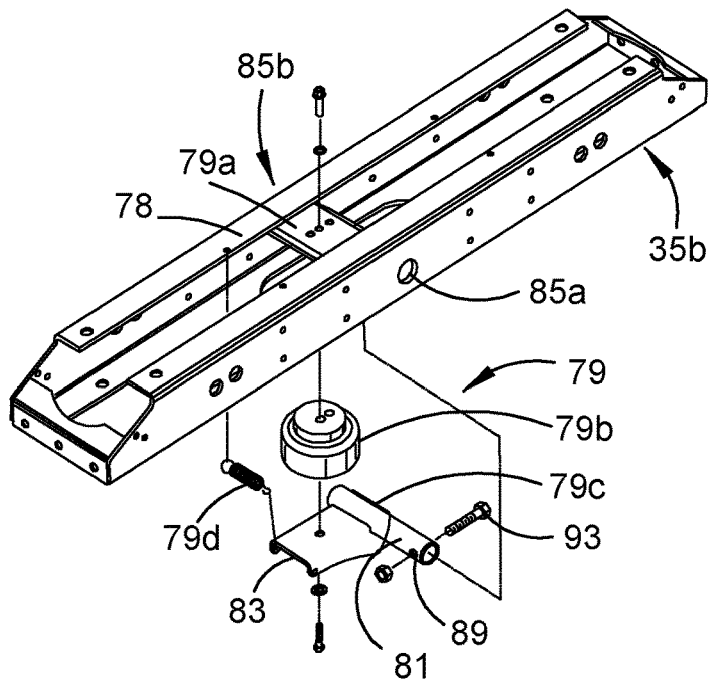
FIG. 5 is an exploded view of a cross member/actuator assembly.

As noted, the members 49a, 49b of the cross member 35a are mutually identical. This reduces manufacturing and inventory costs. The cross members 35a, 35b are also mutually identical with the same advantages. The cross member 35b carries an actuator 79 for withdrawing the locking pins 77. As best illustrated in FIG. 5, the actuator 79 incorporates a top plate 79a, an airbag 79b, an output member 79c and a tension spring 79d.

The output member 79c incorporates a straight cylindrical portion 81 and a side wing 83. The long vertical walls of the member 35b are penetrated by central through-holes 85a, 85b in which suitable portions of the output member 79c reside to pivotally mount the output member 79c. In this example, it is portions of the cylindrical portion 81 projecting fore and aft of the wing 83 which reside in the holes 85.

To assemble the cross-member 35b and actuator 79, the output member 79c is inclined and passed downwardly through the top opening of the member 35b to pass one end of the portion 81 through the hole 85a. The member 79c is then further lowered and reversed to insert a rear of the member 81 into the hole 85b. The airbag 79b is then fastened to the wing 83 and top member 79 is slid in place to act between the top of the airbag 79b and an underside of the top flange of the cross member 35b. The top member 79a is dimensioned for only limited movement in the fore and aft direction within the long vertical walls of the member 35b whereby, upon fastening the airbag 79b to the top member 79a, the fore and aft movement of the member 79c is limited so that the portion 81 does not tend to fall out of the hole 85b during construction of the unit 31. The tension spring 79d acts between the wing 83 and a hole 87 (or other suitable mounting point) passing through the top flange of the cross member 35b.

The forwardly projecting end of the member 81 is penetrated by a transverse screw hole 89.

A shaft 91 (FIG. 4) for rotating to withdraw the locking pins 77 is coupled to the output member 79c to be driven by the actuator 79. To install the shaft 91, an end 91a is first inserted into the through-hole 85b of the cross member 35a. By sliding the shaft 31 forward through the hole 85b, its rearward end 91a can then be lowered into alignment with the output member 79c, or more specifically the forward projecting end of its portion 81. The shaft 91 includes, at its rear end 91b, a socket which, by moving the shaft 91 rearwardly, is fitted over the forward end of the portion 81. The socket at the end 91b has a transverse hole complementary to the hole 89. The end of the portion 81 and this socket (or more specifically the complementary holes) are then fitted with a bolt 93 to form a coupling by which the shaft 91 is driven to rotate.

This method of installing the shaft 91 is simple, robust and cost-effective, and is well within the scope of a semi-skilled worker.

In this example, the shaft 91 is a crank shaft, including cranks pivotally attached to con rods which are in turn connected to the locking pins 77. Other variants are possible. By way of example, cords wrapped about the shaft 91 could connect the shaft 91 to the locking pins. In such an example, the shaft might rotate through multiple turns to withdraw the locking pins, in contrast to the illustrated embodiment in which the actuator rotates through only 30° or so.

The spring 79d serves to bias the locking pins 77 to their extended, locking, position.

Whilst the cross members 35a, 35b are mutually identical, the cross member 35c is of relatively lighter-weight construction. The cross member 35c incorporates a single C-channel 49a opposed only by a pair of short channel sections 49d. As such, the cross members 35a, 35b, 35c are mostly made up of five mutually identical channel sections.

Whilst various examples have been described, the invention is not limited to these examples. Rather, the invention is defined by the claims.

The invention claimed is:

1. A chassis portion, for a vehicle chassis, including
a chassis rail;
a cross member;
a suspension hanger; and
an arrangement for clamping, a portion of the chassis rail, between a portion of the hanger and a portion of the cross member;
wherein the chassis rail is penetrated by at least one fastener-receiving opening;
the arrangement for clamping includes at least one fastener portion for passing through the fastener-receiving opening;
an underside of the cross member has a feature by which the cross member is fastened or fastenable to the hanger; and
the feature is at least one of a fastener portion and a hole for a fastener portion.

2. The chassis portion of claim 1 wherein the feature is a hole for a fastener portion.

3. The chassis portion of claim 2 wherein the chassis rail defines a rail-receiving opening into which an end of the cross member is receivable.

4. The chassis portion of claim 3 wherein the chassis rail has a top flange, running along a top of the rail-receiving opening, and a top flange feature by which the top flange is fastened or fastenable to the cross member.

5. A chassis portion, for a vehicle chassis, including
a chassis rail;
a cross member;
a suspension hanger; and
an arrangement for clamping, a portion of the chassis rail, between a portion of the hanger and a portion of the cross member;
wherein the chassis rail defines a rail-receiving opening into which an end of the cross member is receivable; and
the chassis rail has a top flange, running along a top of the rail-receiving opening, and a top flange feature by which the top flange is fastened or fastenable to the cross member.

6. The chassis portion of claim 4 wherein the top flange feature is one of a fastener and a fastener hole.

7. The chassis portion of claim 4 wherein the top flange feature is a fastener hole.

8. The chassis portion of claim 6 wherein the chassis rail has a substantially uniform profile along at least most of its length.

9. The chassis portion of claim 8 wherein the chassis rail has an inverted G-profile.

10. The chassis portion of claim 1 wherein the cross member has two channels sections running parallel to, and opening towards, each other.

11. The chassis portion of claim 1 wherein the chassis rail is individually coated with a corrosion impeding coating.

12. The chassis portion of claim 1 wherein the cross member is individually coated with a corrosion impeding coating.

13. The chassis portion claim 1 wherein the chassis portion is a portion of a chassis for a slider-suspension unit for a trailer.

14. The chassis portion claim 8 wherein the chassis portion is a portion of a chassis for a slider-suspension unit for a trailer.

15. The chassis portion of claim 14 wherein the slider-suspension unit includes locking pins for locking the unit at a selected position along the trailer; and the chassis portion includes
a shaft for rotating to withdraw the locking pins;
an actuator carried by one of the cross members and including a rotatable output portion; and
a coupling by which an end of the shaft is coupled or couplable to, to be driven by, the output portion.

16. A chassis, for a vehicle, including the chassis portion of claim 14.

17. A flat-pack kit including the chassis portion of claim 14.

18. A slider-suspension unit, for a trailer, including the chassis portion of claim 14.

19. A chassis portion, for a vehicle chassis, including
a chassis rail;
a cross member; and
a suspension hanger;
an underside of the cross member having a feature by which the cross member is fastened or fastenable to the hanger;
the feature being at least one of a fastener portion and a hole for a fastener portion.

20. A slider-suspension unit, for a trailer, including the chassis portion of claim 19.

21. A chassis portion, for a vehicle chassis, including
a chassis rail;
a cross member;
a bracket; and
an arrangement for clamping, a portion of the chassis rail, between a portion of the bracket and a portion of the cross member;
an underside of the cross member having a feature by which the cross member is fastened or fastenable to the bracket;
the feature being at least one of a fastener portion and a hole for a fastener portion;
the chassis rail defining a rail-receiving opening into which an end of the cross member is receivable;
the chassis rail having a top flange running along a top of the rail-receiving opening and having a top flange feature by which the top flange is fastened or fastenable to the cross member.

22. A slider-suspension unit, for a trailer, including the chassis portion of claim 21.

23. The chassis portion of claim 5 wherein the top flange feature is one of a fastener and a fastener hole.

\* \* \* \* \*